POLYPHASE DRIVE SYSTEM INCLUDING A SHIFT REGISTER

Filed Jan. 12, 1965

3 Sheets-Sheet 1

INVENTOR.
THOMAS C. STOCKEBRAND
BY
Blair & Buckles
ATTORNEYS

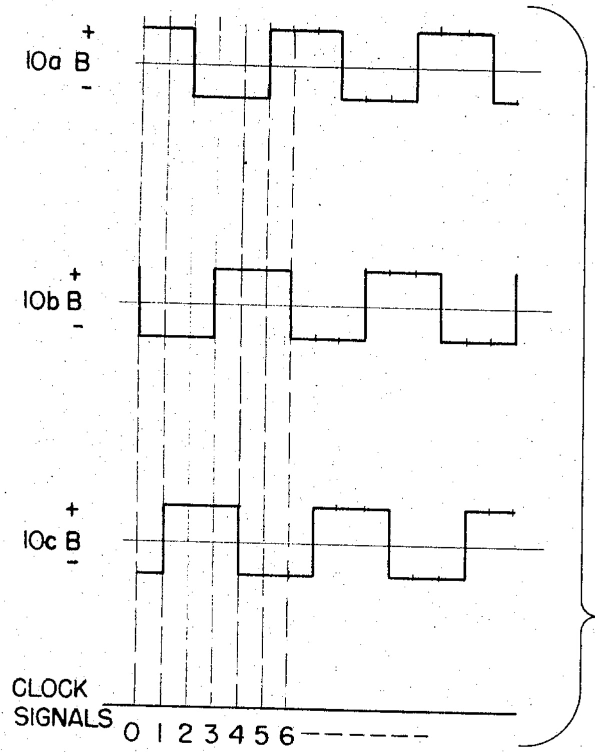
FIG. 4
| | | FLIP-FLOP 80 | FLIP-FLOP 82 |
|---|---|---|---|
| CLOCK PULSE NUMBER | 0 | 0 | 0 |
| | 1 | 0 | 1 |
| | 2 | 1 | 1 |
| | 3 | 1 | 0 |
| | 4 | 0 | 0 |
FIG. 6
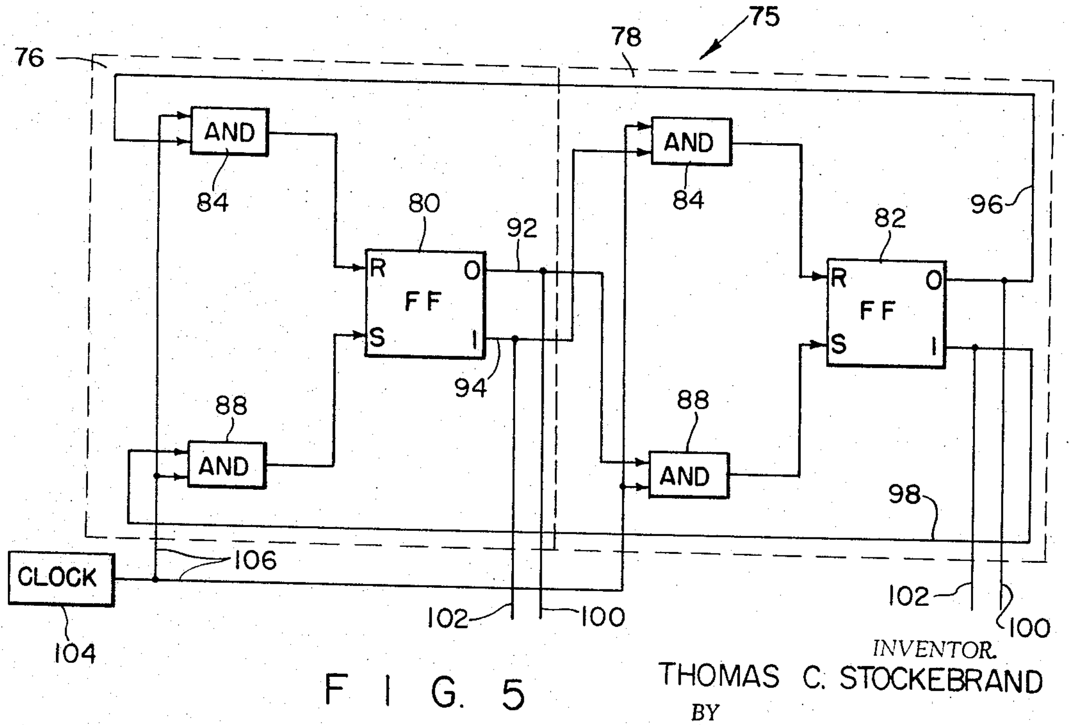
FIG. 5
INVENTOR.
THOMAS C. STOCKEBRAND
BY
Blair & Buckles
ATTORNEYS INVENTOR.
THOMAS C. STOCKEBRAND
BY
Blair & Buckles
ATTORNEYS 3,354,367

POLYPHASE DRIVE SYSTEM INCLUDING A SHIFT REGISTER

Thomas C. Stockebrand, Acton, Mass., assignor to Digital Equipment Corporation, Maynard, Mass.

Filed Jan. 12, 1965, Ser. No. 425,038
4 Claims. (Cl. 318—138)

This invention relates to a polyphase power source and to a synchronous motor drive system incorporating the source. It relates more particularly to a polyphase power supply especially suited for driving an alternating-current motor at a plurality of forward and reverse speeds and also for holding the motor armature in one position when the motor is stopped.

In general, polyphase synchronous motors are preferred over other varieties because they are small and inexpensive, yet reliable and efficient. These characteristics make such motors particularly suited for use in driving computer tape transports.

For this particular application, however, such motors should be capable of operating at different, carefully controlled speeds in both the forward and reverse directions. For example, when the computer calls for information stored at a location on the tape, the tape drive should be able to move the tape extremely rapidly until the tape location draws near a read-out head; then it should slow down and move the tape at a slower rate during read-out. When not commanded to move the tape, the transport should hold it in place, so that the position of the tape is always known.

The full potential of polyphase motors for use in tape transports has, however, not been realized, principally because of the difficulty in satisfactorily powering them. Prior polyphase sources tend to be rather elaborate and costly to manufacture, offsetting the savings and advantages gained by selecting such motors in the first instance. In this connection, it should be borne in mind that a source of this type should have a variable frequency in order to accomplish the desirable multispeed operation. Furthermore, the prior sources have no provision for holding the position of the motor when it is supposed to be stopped. Additional equipment has had to be provided for this purpose, adding to the expense and complexity of the system.

Accordingly, it is a principal object of this invention to provide an improved drive system for use with tape transports.

A further object of this invention is to provide such a drive system which is operable at a plurality of different speeds in both the forward and reverse directions.

Another object of this invention is to provide a drive system for use with a tape transport in which the drive motor armature is held in one position when the motor is supposed to be stopped.

It is a more specific object of this invention to provide a small, light-weight drive system of the above type which is easily assembled using relatively inexpensive, yet reliable components.

Another more specific object is to provide a polyphase power supply for use in a drive system as above described.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and object of the invention, reference should be had to the following detailed description taken in connection with the accompanying drawings, in which:

FIG. 4 is a schematic diagram showing the relationships between the magnetic fields produced in the drive motor windings by the several stages of the drive system of FIGS. 1 and 2;

FIG. 5 is a schematic diagram of a two-phase drive system embodying the principles of this invention;

FIG. 6 is a table similar to that of FIG. 3 for the two-phase system of FIG. 5.

In general, my drive system employs a recirculating shift register to power a synchronous polyphase alternating-current motor. The shift register has a plurality of stages and corresponding electrical outputs according to the number of phase windings in the motor. Shifting of the register in response to a series of clock pulses produces a plurality of alternating output voltages having the proper phase relationships required to drive the particular motor. The rate at which the register shifts depends on the clock pulse rate and therefore, the motor speed can be varied by changing the clock frequency.

Further, when the clock signals cease, as when the motor is to be stopped, the shift register supplies direct current to the motor to help stop the motor and hold its armature in one position.

Figures 1, 2, 3:
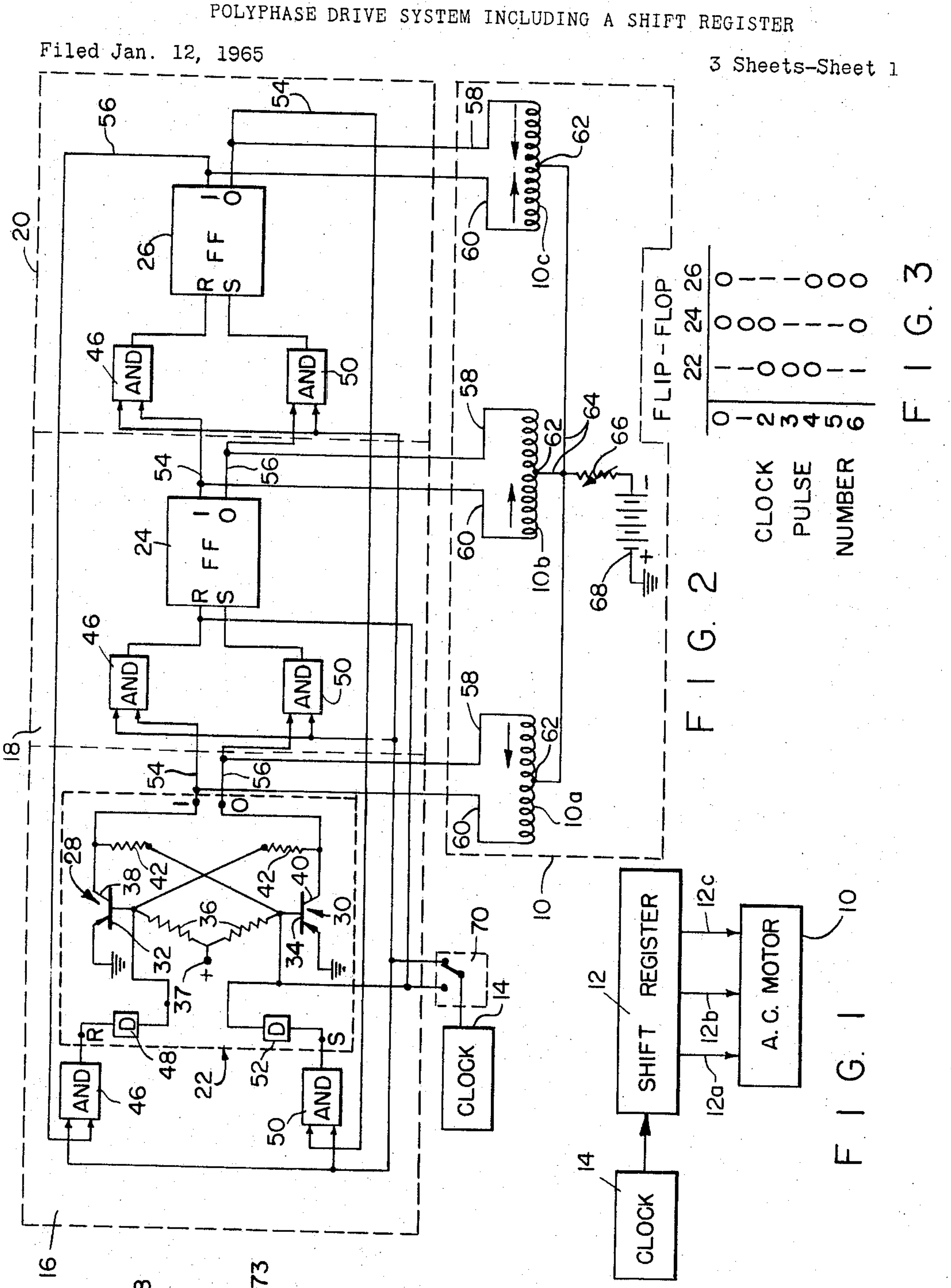
FIG. 1 is a schematic diagram of a drive system embodying the principles of my invention and adapted for three phase operation.
FIG. 2 is a schematic diagram showing in greater detail the drive system of FIG. 1.
FIG. 3 is a table showing the states of the several stages of the drive system of FIGS. 1 and 2 after successive clock signals.

Referring now to FIG. 1, which shows the basic elements of my drive system adapted for three phase operation, a polyphase motor 10 is electrically connected to the output terminals 12*a*, 12*b* and 12*c* of a shift register 12. Terminals 12*a–c* each comprise in actuality two conductors.

The motor 10 may be a conventional three-phase induction motor. It should have a short mechanical time constant and relatively high hysteresis torque. For example, in tape transports employing spring devices for tensioning the tape to hold it against the transducer head, a hysteresis torque of twenty percent of maximum torque may be desirable. In transports employing a vacuum system instead of the aforementioned spring devices, a lesser hysteresis torque will suffice. It has the usual three phase windings in its stator displaced from one another by 120°. Preferably, these windings are provided with center taps for reasons that will become apparent. It should be understood, however, that the teachings of my invention are applicable also in powering two-or four-or more phase motors as will be desecribed later. The shift register 12 is a recirculating unit. That is, its stages are arranged in a ring, with the output of each stage electrically connected to the input of another, succeeding stage. The number of outputs, and hence the number of register stages, corresponds to the number of windings in the motor powered by the source. Thus, register 12 has three stages and the three output terminals 12*a*, 12*b* and 12*c* connected to the motor 10.

In the illustrated circuit register 12 is actuated by negative signals from a conventional clock pulse generator 14. Preferably, generator 14 provides output pulses at several selectable repetition rates. It may also be stopped entirely, in which case no pulses are produced.

Referring now to FIG. 2, register 12 comprises three stages 16, 18 and 20 employing conventional flip-flops 22, 24 and 26. These flip-flops are of conventional construction. Illustratively, each comprises a pair of similar p-n-p transistors 28 and 30 connected in the grounded emitter configuration.

Each flip-flop has reset (R) and set (S) input terminals and ZERO (0) and ONE (1) output terminals. The R and S input terminals of the flip-flop are connected respectively to the base 32 of transistor 28 and the base 34 of transistor 30. The bases 32 and 34 are connected also through similar resistors 36 to a positive voltage supply terminal 37. The ONE and ZERO output terminals of the flip-flop are connected respectively to collector 38 of transistor 28 and collector 40 of transistor 30 and ultimately to the negative terminal of a power supply illustratively shown as a battery 68. The collectors 38 and 40 are connected also through similar resistors 42 back to the opposite bases 34, 32.

A negative input pulse at the S terminal imposes the ONE state on the flip-flop with the ONE and ZERO output terminals then being at —V and ground potentials respectively. Conversely, a pulse at the R input terminal imposes the ZERO state on the flip-flop, with the ZERO and ONE terminals then being at —V and ground potentials respectively.

Each flip-flop 22, 24 and 26 has an AND circuit 46 electrically in series with its R input terminal, and a similar AND circuit 50 in series with its S input terminal. A delay element 48 is interposed between AND circuit 46 and the R input terminal and a similar delay element 52 is between the AND circuit 50 and the S input terminal. The purpose of the delay elements 48 and 52 is to permit sensing of the states of the output terminals almost simultaneously with the pulsing of the flip-flop input terminals but prior to the change of state due to such pulsing. These delays may conveniently be built into the flip-flops 22, 24 and 26.

The ZERO output terminal of each flip-flop 22, 24 and 26 is connected to an input terminal of the AND circuit 50 in the S input line of the succeeding flip-flop in the ring. Conversely, the ONE output terminal of each of those flip-flops is connected to an input terminal of the AND circuit 46 in the R input line of the succeeding flip-flop.

The ZERO and ONE output terminals of each flip-flop are also electrically connected by leads 58 and 60, respectively to the opposite ends of one of the windings 10*a*, 10*b*, and 10*c* of motor 10. The respective pairs of leads 58, 60 constitute the three register output terminals 12*a*, 12*b* and 12*c* referred to in connection with FIG. 1.

The motor 10 windings are provided with center taps 62, all of which are electrically connected by leads 64 through a variable resistor 66 to the negative terminal of battery 68, the positive terminal of which is grounded. Battery 68 supplies power to the motor 10 as well as the several transistors 28 and 30.

Negative clock signals are supplied to each stage of the register 12 by way of a switch 70 connected between clock 14 and the remaining input terminal of each AND circuit 46, 50 of the register.

In accordance with this invention, the states of flip-flops 22, 24 and 26 must not all be the same when the drive system is started initially. To satisfy this requirement, the switch 70 is arranged to initially impose different states on at least two of the three flip-flops. Specifically, the switch 70 is a double throw device which, in the illustrated position, connects the clock 14 to all the AND circuits. In its other position it connects the clock to the S input terminal of flip-flop 22 and the R input terminal of flip-flop 24. Initially, as the switch 70 is moved momentarily to the latter position so that the next triggering pulse from clock 14 being applied to opposite inputs of flip-flops 22 and 24, imposes different states on those elements, i.e. the ONE state on the flip-flop 22 and the ZERO state on flip-flop 24. The switch 70 is then returned to the illustrated position for operation of the system.

Assume, as an example, that the remaining flip-flop 26 is also in the ZERO state.

The table of FIG. 3 then indicates in its top row of binary digits the initial states thus imposed on the three flip-flops 22, 24 and 26.

During normal operation, when the first clock pulse is applied to register 12, the voltage at the respective output terminals 12*a*, 12*b* and 12*c* are sensed. Flip-flop 22, being in the ONE state, the voltage at its ONE output terminal enables the AND circuit 46 in the stage 18 and this AND circuit passes the clock pulse to the R input terminal of flip-flop 24. Flip-flop 24 is already in the ZERO state, so no change occurs in its state.

Flip-flop 24 being in the ZERO state, the voltage at its ZERO output terminal enables the AND circuit 50 in stage 20. The AND circuit, therefore, passes the clock pulse to the S input terminal of flip-flop 26, causing this flip-flop to change to the ONE state.

The voltage at the ZERO output of flip-flop 26 (which is initially in the ZERO state in this example) enables the AND circuit 50 in stage 16 and the AND circuit passes the clock pulse to the S input terminal of flip-flop 22. As flip-flop 22 is already in the ONE state, no change occurs there.

At this point, the states of the respective flip-flops are as represented by the second row of binary digits in the table of FIG. 3. It will be noted that if the flip-flop 26 happened to be in the ONE state at the outset, this second row of binary digits would represent the initial setup of the shift register 12.

When successive clock pulses are applied to the register, they are steered to the appropriate input terminal of each flip-flop according to the state of the preceding flip-flop in the ring. With each clock pulse, each flip-flop 22, 24 and 26 assumes (or retains) the state opposite to the state that its preceding flip-flop had prior to that clock pulse. These relations between the successive states of the several flip-flops are illustrated by the table in FIG. 3.

FIG. 3 shows that each flip-flop changes its state once every three clock pulses. It follows then that the voltages at the ZERO and ONE output terminals of each flip-flop (i.e. at terminals 12*a*, 12*b* and 12*c*) likewise change once every three clock pulses. That is, they complete a full cycle between ZERO and V volts once every six clock pulses. This is also seen from the fact that the table of FIG. 3 repeats itself every six clock pulses. In other words, after six clock pulses the set up of the register stages is the same as at the outset.

As shown in FIG. 2, the ZERO and ONE output terminal pairs in the three register stages are connected to the opposite ends of the respective motor windings 10*a*–10*c*. The voltage from battery 68 is applied to the center taps 62 of these windings. The voltage across each motor winding depends on the state of its corresponding register stage. Thus, assuming the register has the initial setup described above, i.e. 1,0,0 (FIG. 3), transistor 30 of flip-flop 22 is conducting, while transistor 28 is cut off. Accordingly, the ZERO terminal is grounded through transistor 30 and the current flow during the initial portion of the cycle, indicated by the solid arrow, is clockwise through the right half of winding 10*a* between lead 58 and center tap 62. No current flows through the left half of the winding 10*a*.

Just the opposite situation prevails in windings 10*b* and 10*c*. The ONE terminals are grounded. Accordingly, current flows counterclockwise through the left halves of windings 10*b* and 10*c* between their leads 60 and center taps 62, as indicated by the solid arrows. Of course, no current flows through the right halves of those windings.

When the next clock pulse shifts the register, the first two flip-flops 22 and 24 remain in the same state, (FIG.

3). Accordingly, the direction of current flow through windings 10$a$ and 10$b$ during the second portion of the cycle remains the same as before the first pulse. Flip-flop 26, on the other hand, assumes the ONE state. Its transistor 30 conducts, causing current to shift to the right half of winding 10$c$ and flow clockwise therein as indicated there by the dotted arrow.

As seen from FIG. 3, with the arrival of the next clock pulse, the first flip-flop 22 assumes the ZERO state. The other two flip-flops do not change. Accordingly, during this portion of the cycle, current flows counterclockwise through the left half of the winding 10$a$. The corresponding current flow in windings 10$b$ and 10$c$ remains the same as before this pulse. Each successive change in the setup of the register due to a subsequent clock pulse (FIG. 3) produces a change in the direction of current flow through one of the windings 10$a$–10$c$ in the same manner.

At any given instant, then, current is flowing in half of each motor 10 winding. The direction of current flow in each winding changes every three clock pulses in accordance with the table of FIG. 3.

Thus there is produced in each winding 10$a$–10$c$ a magnetic field having a polarity reversal every three clock pulses. The field alternates between two values, resulting in a substantially square waveform as shown in FIG. 4. The polarity reversals for each winding are, however, displaced by two clock pulses from those of the other windings. This corresponds to a phase difference of 120° as required for three-phase operation.

More specifically, as shown in FIG. 4, the alternations of the magnetic field developed in the winding 10$b$ lead those of the winding 10$a$ by two clock pulses, or one-third the six pulses required for a full cycle. Thus, the field of the winding 10$b$ leads that of winding 10$a$ by a phase angle of 120°. Similarly, the magnetic field of winding 10$c$ leads that of winding 10$b$ by two clock pulses or 120°; and the field of winding 10$a$ leads that of winding 10$c$ by the same amount. The net effect of the individual alternating fields is to produce a resultant rotating magnetic field which thus provides conventional three-phase motor operation. The speed of the motor depends on the rotational speed of the magnetic field; particularly these quantities are directly related if the motor is a synchronous motor. The speed of field rotation, in turn, is proportional to the frequency of the field current supplied by the shift register.

Figure 2A:
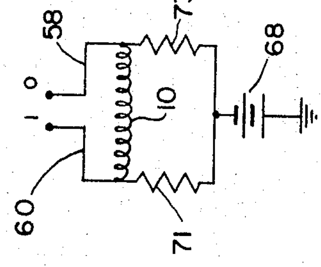
FIG. 2A is a similar diagram illustrating a modified drive system.

FIG. 2A illustrates an alternative mode of connecting the register 12 stages to the motor 10 windings. Here, the ZERO and ONE output terminals of each register stage are connected to the opposite ends of the corresponding motor winding as described previously. The left and right hand ends of the motor winding are also connected through resistors 71 and 73 respectively to the negative terminal of the battery 68. With this arrangement, current flows through the winding on both halves of each cycle, but in opposite directions. That is, it passes through the winding by way of the resistor 71 during one half-cycle, and then by way of the resistor 73 during the next half-cycle. It will be apparent that with this arrangement each winding need be only half as large as in FIG. 2. This advantageous effect is offset somewhat, however, by the energy losses in resistors 71 and 73.

As noted previously, it is desirable that motors used in tape transports be capable of operating at a plurality of forward and reverse speeds, and also of stopping entirely. The speed control is accomplished by varying the output frequency of the shift register. The frequency is proportional to the clock pulse rate. Accordingly, the speed can be changed quickly and simply by altering the frequency of the clock 14. For this purpose, the clock is preferably a variable frequency unit. For example, it may produce pulses at selected first and second rates to cause the motor 10 to operate at the speeds required for the scan and read-out modes of a digital tape system.

With polyphase motors, it is a problem to maintain constant energizing flux (and hence torque) with changes in electrical frequency. The problem is overcome usually by altering the voltage applied to the motor windings with changes in frequency. This may be done in any one of a number of conventional ways. Illustratively, it is accomplished here by appropriately changing the value of the variable resistor 66 with changes in the frequency of clock 14. For a two-speed tape drive, resistor 66 would have three positions and could be coupled to a control device for the clock 14, so that when the clock is switched from the fast to the slow scan rate, the resistance of the resistor would increase sufficiently to reduce the voltage across winding 10$a$–10$c$ by the amount necessary to maintain constant flux in the motor 10.

The third position of variable resistor 66 would provide an even larger resistance value for use when the clock 14 is set to stop motor 10 entirely, preventing burn-out of the motor winding 10$a$–10$c$ due to excessive current.

The motor 10 may be made to operate in reverse at the same selected speeds simply by interchanging any two of the three output terminals 12$a$, 12$b$ and 12$c$, (each comprising two conductors 58, 60) leading from register 12 to motor 10, using any conventional switching means (not shown). This interchange of terminals changes the phase relationships among the fields generated in windings 10$a$–10$c$ and thereby reverses the direction of rotation of the resultant magnetic field.

Figure 7:
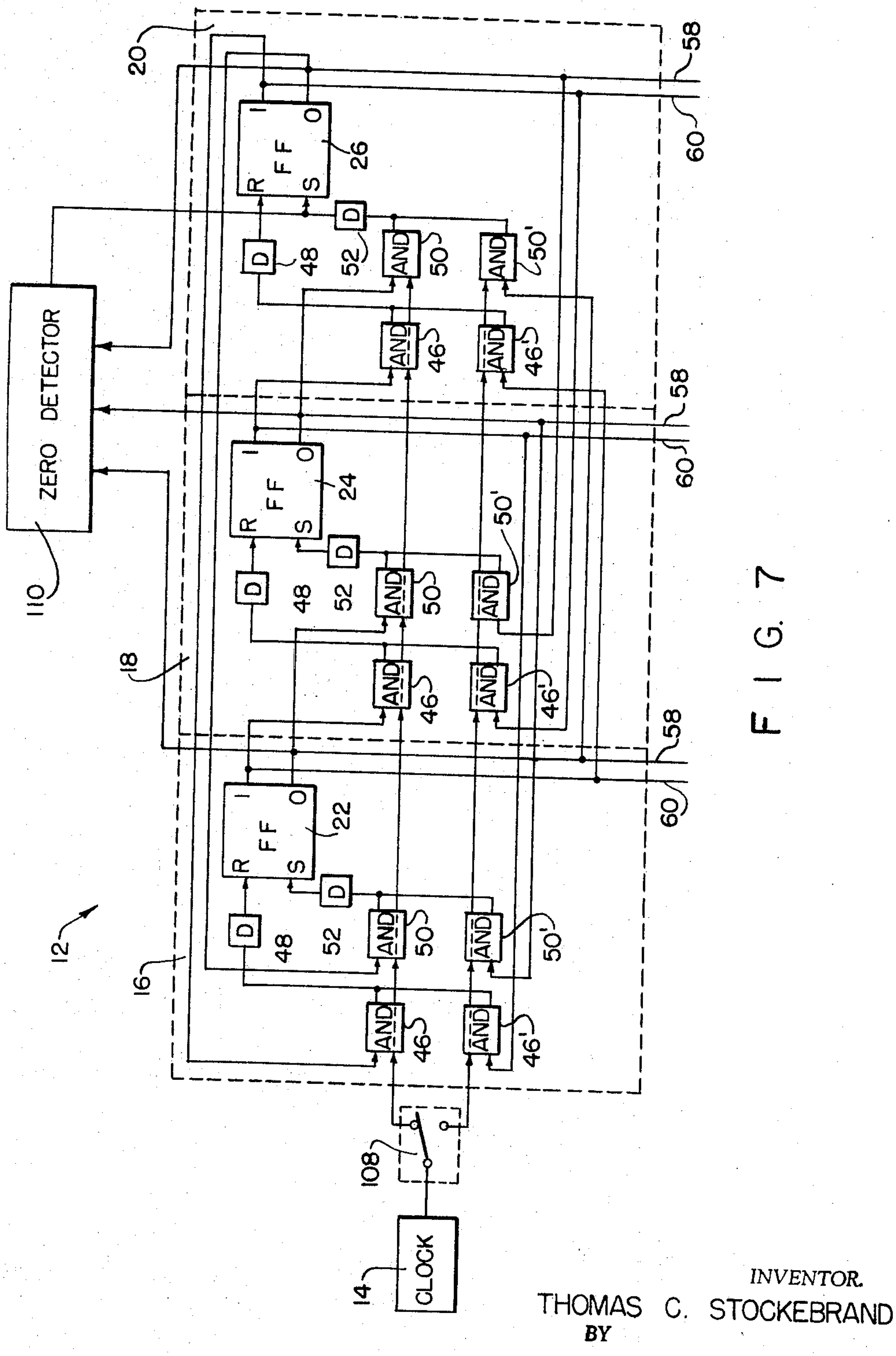
FIG. 7 is a schematic diagram of another modified form of my drive system.

FIG. 7 shows a modified form of shift register 12 employing a different technique for reversing the motor.

The register utilizes one set of AND circuits 46, 50 to gate the flip-flops 22, 24 and 26 so as to drive the motor 10 in the forward direction as described in connection with FIG. 2.

In addition, a second set of AND circuits 46, 50 operates to gate the flip-flops 22, 24 and 26 in just the reverse order from that described above.

More particularly, each flip-flop has an AND circuit 46′ in series with its R input terminal and an AND circuit 50′ in series with its S input terminal. The ZERO and ONE output terminals of each flip-flop are connected to the input terminals of the AND circuits 46′ and 50′ in the S and R input lines of the preceding flip-flop in the ring. In other words, the output signal from the first flip-flop 22 is fed to the AND circuits 46′ 50′ connected to the input terminals of the third flip-flop 26; the output signal from the second flip-flop 24 is applied to the AND circuits 46′, 50′ connected to the input terminals of the flip-flop 22′ and the output of the flip-flop 26 is applied to the AND circuits 46′, 50′ connected to the input terminals of the flip-flop 24.

A clock 14 supplies clock signals via a switch 108 to either the AND circuits 46, 50 or the AND circuits 46′, 50′. When the register is connected to the motor 10 windings (FIG. 2), it produces a resultant rotating magnetic field which drives the motor in one direction, as described above, when the switch 108 is in the illustrated position, and in the opposite direction when the switch 108 connects the clock 14 to all the AND circuits 46′, 50′.

Specifically, with the latter condition of the switch 108, the direction of current flow in each motor 10 winding changes every three clock pulses in accordance with the table of FIG. 3, reading from the bottom up. A resultant magnetic field is produced in motor 10 which rotates in the opposite direction from that described above, thereby reversing the motor.

With this mode of reversing the motor, reversal switching is done in the low level, clock signal circuit rather than in the higher level output circuit. Consequently, it is accomplished more easily and with substantially no attendant arcing.

As before, the states of the flip-flops 22, 24 and 26 must not all be the same at the outset or during normal operation of the drive system. This requirement is satisfied in the circuit of FIG. 7 by means of a ZERO detector 110 taking the form of an AND circuit. The signals appearing at the ZERO output terminals of the flip-flops 22, 24 and 26 are fed to the ZERO detector. The output of the ZERO detector is in turn applied to the S input terminal of one of the flip-flops, for example, flip-flop 26. Delay means 48 and 52 are provided in the R and S input lines respectively to insure that the signal from detector 110 will arrive at flip-flop 26 before the next clock pulse. The ZERO detector 110 will immediately apply a signal to the S input of flip-flop 26 whenever all three flip-flops are in the ZERO state. This condition may occur initially, or it may occur at any point during the operation of the drive system as a result of a minor malfunction. Thus, if at any time all three flip-flops assume the ZERO state, a pulse is applied to the S input terminal of flip-flop 26 immediately changing this flip-flop to the ONE state. At this point, the setup of the register becomes the same as that shown in the third row of binary digits in the table of FIG. 3. Further successive clock pulses then cause the register to shift normally as described previously.

If, on the other hand, the three flip-flops of the register all assume the ONE state at any time, the next clock pulse will change all three flip-flops to the ZERO state. The detector 110 will then sense the simultaneous ZERO condition of all three flip-flops and again apply a signal to the S input terminal of flip-flop 26 as described above. Accordingly, the ZERO detector 110 not only insures that the drive system will start properly, but will also guard against malfunctions, during operation of the system, tending to upset the proper phase relationship between output signals of the three register stages.

As mentioned above, upon cessation of clock signals, register 12 ceases to circulate. When that occurs, each flip-flop 22, 24 and 26 remains in one of its two stable states, sending direct current to the motor 10 winding connected thereto. This direct current gives rise to a stationary magnetic field in the motor which, by means of eddy-current braking, helps to stop the motor. Also, once the armature has stopped, the stationary field supplies a holding force by virtue of hysteresis in the motor. The hysteresis resists the local changes in magnetic flux corresponding to rotation of the armature.

This provision for supplying constant holding current to the motor windings when the motor is stopped is particularly desirable for motors used in tape transports. Such motors must not only stop the tape quickly, but they also should maintain it in position without drift once it has been stopped.

It will be appreciated that the teachings of this invention are applicable also to drive systems utilizing motors other than the three-phase variety.

FIG. 5 shows a power supply suitable for driving a two-phase motor (not shown) having field windings displaced by 90°. The two-phase system comprises a recirculating shift register 75 having two stages 76 and 78. As before, the stages include conventional flip-flops 80 and 82, one in each of the register stages. The flip-flops 80 and 82 are the same as those described in connection with the three-phase device of FIG. 1. Each has the usual R and S input terminals and ZERO and ONE output terminals. The flip-flops 80 and 82 also have AND circuits 84 connected in series to their R input terminals, as well as AND circuits 88 in series with their respective S input terminals.

In the case of the two-phase device of FIG. 5, the ZERO output terminal of flip-flop 80 is connected by a lead 92 to an input terminal of the AND circuit 88 in the S input line of flip-flop 82. The ONE ouput of flip-flop 80 is connected by a lead 94 to an input terminal of the AND circuit 84 in the R input line of flip-flop 82.

The connection between the output of flip-flop 82 and the input of flip-flop 80 differs in that the ZERO output terminal of flip-flop 82 is connected by a lead 96 to an input terminal of AND circuit 84 in the R input line of flip-flop 80, while the ONE output of flip-flop 82 is connected by an electrical lead 98 to a terminal of AND circuit 88 in the S input line of flip-flop 80.

Additional electrical leads 100 and 102 are connected to the ZERO and ONE output terminals respectively of both flip-flops 80 and 82. These serve as the register output terminals for connecting to the field windings of a two-phase motor (not shown). These connections are the same as described above with respect to the FIG. 2 or FIG. 2A three-phase system. Also, a clock 104 is connected by means of electrical leads 106 to the other input terminals of the AND circuits 84 and 88 for supplying pulses to the shift register 75.

Unlike the three-phase drive system, no particular initial condition has to be imposed on the register 75. Assume that each of flip-flops 80, 82 is in the ZERO state. The AND circuits 84 in stage 76 and 88 in stage 78 are enabled. The AND circuits 88 in stage 76 and 84 in stage 78 are disabled. The next pulse from clock 104 is therefore passed to the S input of flip-flop 82 and the R input of flip-flop 80. This causes the flip-flop 82 to change to the ONE state, with flip-flop 80 remaining in the ZERO state. Upon succeeding clock pulses, flip-flop 80 assumes (or retains) the same state that flip-flop 82 had prior to the clock pulse, while flip-flop 82 assumes (or retains) the state opposite to that of flip-flop 80 prior to the pulse.

The table of FIG. 6 shows the states of the two flip-flops 80 and 82 after successive clock pulses. Each flip-flop 80, 82 completes a full cycle between the ZERO and ONE states once every four clock pulses (or 360°). In other words, the two phase shift register returns to its initial condition after four clock pulses. Moreover, the flip-flop 80 always shifts to the ONE or ZERO state one clock pulse after the same change of state in the flip-flop 82. Thus, the flip-flop 80 lags the flip-flop 82 by a phase angle of 90°. Thus, the currents in the field windings connected to the terminals 100–102 of the flip-flops 80 and 82 are displaced by a phase angle of 90°, as required for two-phase operation.

The two-phase drive system can be changed in frequency to vary the speed of the motor used therein by changing the repetition rate of the pulses from clock 104 as described above. Just as before, when the clock pulses are stopped entirely, the motor stops, and a D.C. holding current is applied to the motor windings to prevent armature drift. Also, the two-phase motor can be operated in reverse by interchanging the output terminals from register stages 76 and 78 or by changing the gating as described in connection with FIG. 7.

It will be appreciated from the foregoing, then, that my system provides a source of true polyphase power driving a polyphase motor at a plurality of different speeds in the forward and reverse directions.

It is clear also that the arrangement described above provides a significant improvement over prior comparable A.C. drive systems in that the power supply not only helps to stop or brake the associated motor, but also holds the motor armature in one position to prevent drift.

The foregoing advantages, plus the fact that the drive system can be made relatively small and quite easily and at relatively little expense, make the apparatus practicable for use in many cases where variable speed drives are required and particularly in computer applications, where the weight and space are factors which must be given special consideration.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and secured by Letters Patent is:

1. A polyphase power source for driving an alternating current motor comprising a recirculating shift register having a plurality of electrical storage elements, the number of said elements corresponding to the number of phase windings in said motor, each of said elements producing an output signal having either one of two determined values, means defining a direct current path for electrically connecting the output signals from said elements to said motor, and means for supplying successive clock signals to said shift register, the elements of said shift register being interconnected such that upon application of said clock signals said elements produce signals having a determined phase relationship with one another and upon cessation of said clock signals said elements produce constant D.C. signals.

2. The combination defined in claim 1 wherein said motor has two-phase windings and said shift register comprises two flip-flops as its storage elements, said flip-flops being so interconnected that when each clock pulse is applied to the register, one flip-flop assumes the same state that the other flip-flop had prior to the clock pulse while the other flip-flop assumes the state opposite that which said one flip-flop had prior to that clock pulse.

3. The combination defined in claim 1 wherein said motor has three-phase windings and said shift register comprises three flip-flops as its storage elements, said flip-flops being connected in a ring in such manner that upon the application of each clock pulse, each flip-flop assumes the state opposite that which its predecessor in the ring had prior to said clock pulse.

4. In a tape drive system a plurality of flip-flops arranged in a ring, each of said flip-flops having R and S input lines and ZERO and ONE output lines, means for connecting the output lines of each flip-flop to the input lines of the next succeeding flip-flop in the ring, each said connecting means including an AND circuit, means for connecting said output lines of each of said flip-flops to different phase windings of an alternating current motor and a variable clock pulse generator connected to said AND circuits.

References Cited

UNITED STATES PATENTS

| | | | |
|---|---|---|---|
| 3,293,459 | 12/1966 | Kreuter et al. | 310—49 |
| 3,297,927 | 1/1967 | Blakeslee et al. | 318—138 |

ORIS L. RADER, *Primary Examiner.*

G. SIMMONS, *Assistant Examiner.*